US008021223B2

(12) United States Patent
Rose

(10) Patent No.: US 8,021,223 B2
(45) Date of Patent: Sep. 20, 2011

(54) GAMING MACHINE HAVING A PENDULUM-BASED PAYOUT INDICATOR

(75) Inventor: Bradley A. Rose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1986 days.

(21) Appl. No.: 10/341,110

(22) Filed: Jan. 13, 2003

(65) Prior Publication Data

US 2004/0137979 A1 Jul. 15, 2004

(51) Int. Cl.
*G06F 19/00* (2006.01)

(52) U.S. Cl. ........................................... 463/16; 463/10

(58) Field of Classification Search ............. 463/16–20, 463/11; 273/138.1, 143 R, 141 R, 141 A
See application file for complete search history.

(56) References Cited

U.S. PATENT DOCUMENTS

| | | | | |
|---|---|---|---|---|
| 719,448 | A * | 2/1903 | Farnum | 273/141 R |
| 1,257,045 | A * | 2/1918 | Stotler | 273/141 A |
| 1,548,482 | A * | 8/1925 | Pegg | 273/161 |
| 3,306,617 | A * | 2/1967 | Gillespie | 273/161 |
| 3,819,186 | A | 6/1974 | Hinterstocker | |
| 5,788,573 | A | 8/1998 | Baerlocher et al. | 463/16 |
| 5,823,874 | A | 10/1998 | Adams | 463/17 |
| 6,162,121 | A | 12/2000 | Morro et al. | |
| 6,270,411 | B1 | 8/2001 | Gura et al. | 463/20 |
| 6,315,660 | B1 | 11/2001 | DeMar et al. | 463/16 |
| 6,322,309 | B1 | 11/2001 | Thomas et al. | 413/20 |
| 6,336,863 | B1 | 1/2002 | Baerlocher et al. | 463/27 |
| 6,398,220 | B1 | 6/2002 | Inoue | |
| 6,443,837 | B1 | 9/2002 | Jaffe et al. | 463/16 |
| 6,719,630 | B1 * | 4/2004 | Seelig et al. | 463/16 |
| 2002/0065131 | A1 | 5/2002 | Seelig et al. | |
| 2003/0064806 | A1 * | 4/2003 | Gordon et al. | 463/42 |
| 2004/0043811 | A1 * | 3/2004 | Seelig et al. | 463/16 |
| 2004/0048673 | A1 | 3/2004 | Kaminkow | 463/46 |

FOREIGN PATENT DOCUMENTS

| | | |
|---|---|---|
| DE | 201 17 936 U1 | 3/2002 |
| GB | 2 096 376 | 10/1982 |

OTHER PUBLICATIONS

WMS Gaming Inc., "Big Bang Piggy Bankin™", *Product Sheet*, (1997),1page.
WMS Gaming Inc., "Palace of Riches™", *Product Sheet*, (1998),1 page.
WMS Gaming Inc., "Top Cat Deluxe™", *Product Sheeet*, (1998),1 page.
WMS Gaming Inc., "Top Banana™", *Product Sheet*, (1999),1page.
WMS Gaming Inc., "Perfect Game™", *Product Sheet*, (2000), 1 page.

* cited by examiner

*Primary Examiner* — Melba Bumgarner
*Assistant Examiner* — Tramar Harper
(74) *Attorney, Agent, or Firm* — Nixon Peabody LLP

(57) ABSTRACT

A gaming machine comprises a central processing unit and a pendulum. The central processing unit operates the gaming machine in response to a wager and selects a game outcome from a plurality of possible game outcomes. The pendulum indicates the game outcome selected by the central processing unit.

23 Claims, 5 Drawing Sheets

GAMING MACHINE HAVING A PENDULUM-BASED PAYOUT INDICATOR

FIELD OF THE INVENTION

The present invention relates generally to gaming machines and, more particularly, to a gaming machine having a pendulum based payout indicator.

BACKGROUND OF THE INVENTION

Gaming machines, such as slot machines, video poker machines and the like, have been a cornerstone of the gaming industry for many years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available, because such machines attract frequent play and hence increase profitability to the operator.

One method of attracting players to gaming machines is by proving a visual indicator of a potential payout or a visual indicator of a winning outcome. For example, slot machine have reels with a plurality of symbols displayed thereon that rotate to align the symbols along a pay line in one of a plurality of different outcomes. As the spinning reels slowly come to rest, the player begins to anticipate the outcome, which increases the entertainment provided to player of the gaming machine.

Other methods of attracting players to gaming machines is by providing a bonus game in addition to a main game. Generally, bonus games provide a greater expectation of winning than the basic game and may be accompanied with more attractive or unusual features including visual features and audible features. Because the visual payout indicator and the bonus game concepts have tremendous advantages in terms of player appeal and excitement relative to other known games, and because such games are attractive to both players and operators, there is a continuing need to develop gaming machines with new types of bonus games, visual indicators, or both, to satisfy the demands of players and operators. The present invention is directed to satisfying this need.

SUMMARY OF THE INVENTION

A gaming machine comprises a central processing unit and a pendulum. The central processing unit operates the gaming machine in response to a wager and selects a game outcome from a plurality of possible game outcomes. The pendulum indicates the game outcome selected by the central processing unit.

The above summary of the present invention is not intended to represent each embodiment, or every aspect, of the present invention. This is the purpose of the figures and the detailed description that follow.

Figure 1:
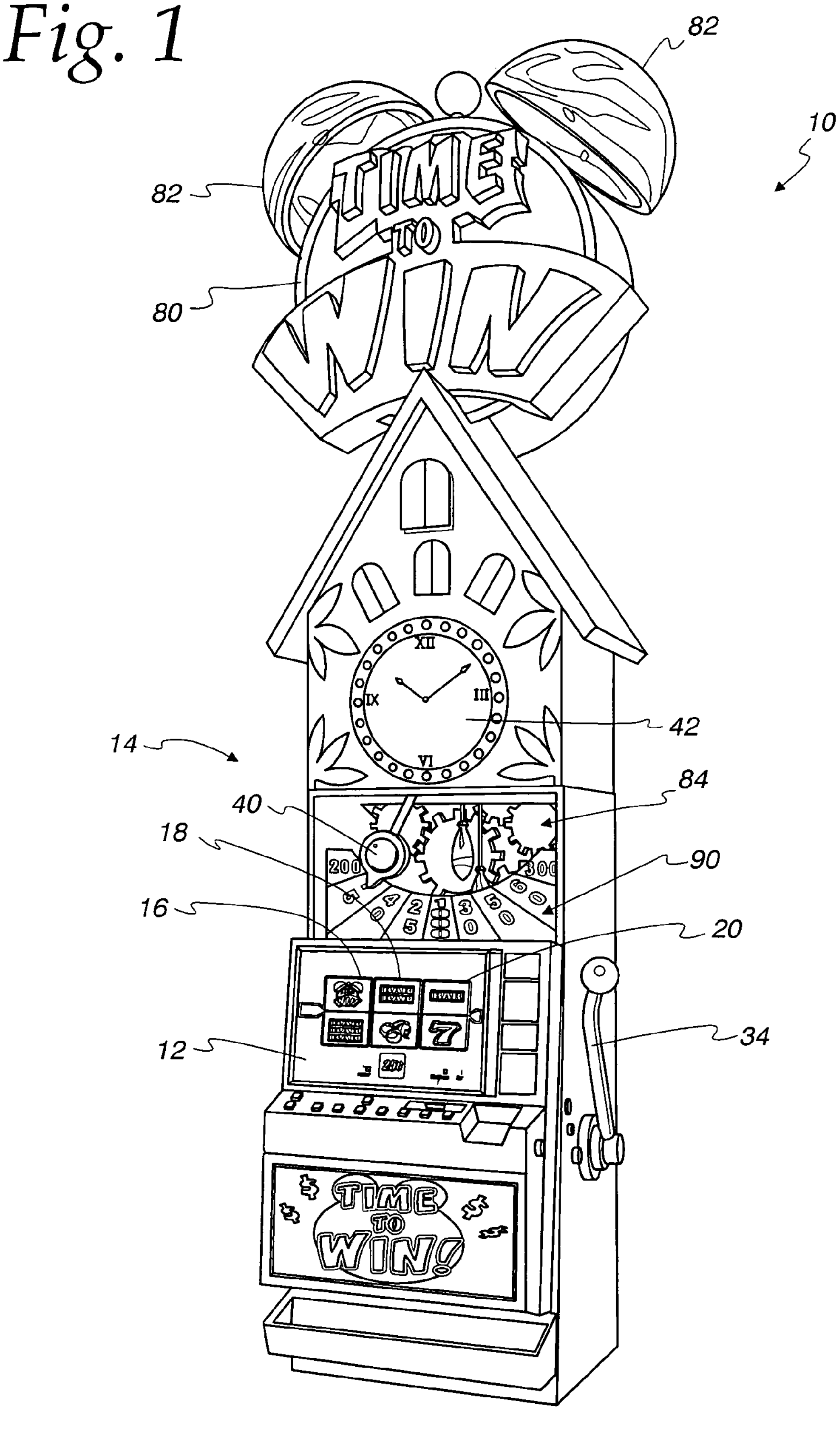
FIG. 1 is a perspective view of a gaming machine having a pendulum-based payout indicator according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE ILLUSTRATED EMBODIMENTS

Turning to the drawings and referring initially to FIG. 1, there is depicted a gaming machine 10 having a pendulum-based payout indicator. The illustrated gaming machine 10 is a reel slot-type gaming machine; however, the present invention is applicable to other types of gaming machines such as, for example, video poker machines. The gaming machine 10 includes a video display 12 and a top box unit 14 for playing both a "basic" game and a secondary or "bonus" game, respectively, according to one embodiment of the present invention. The depicted gaming machine 10 comprises an "upright" machine. It will be appreciated, however, that any of several other models of gaming machines are within the scope of the present invention such as, for example, a "slant-top" version, in which a video display is angled towards a player of the gaming machine. The video display 12 may comprise a dot matrix, CRT, LED, LCD, electro-luminescent display or generally any type of video display known in the art. The video display 12 has three spinning reels 16, 18, and 20 displayed thereon. Alternatively, mechanical reels rather than displayed simulated reels may be used as is known in the art.

Figure 2:
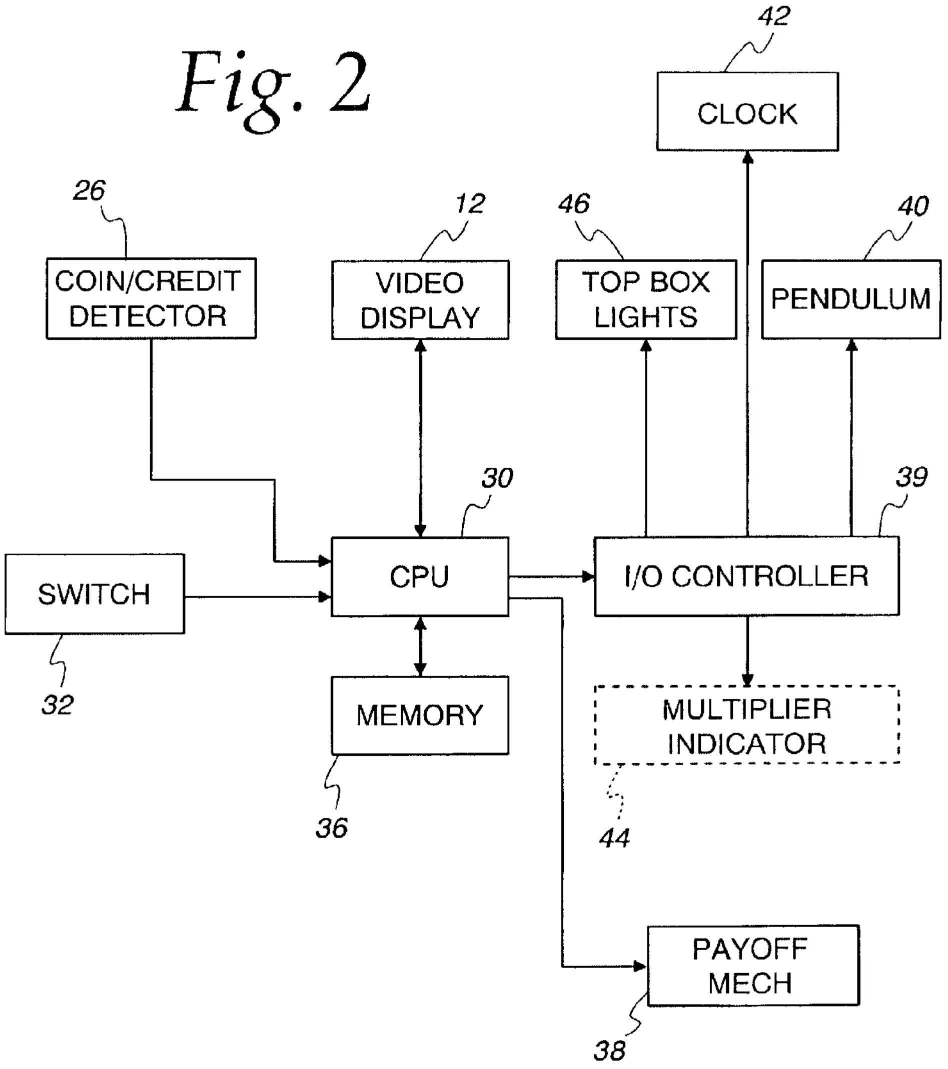
FIG. 2 is a control system for operating the gaming machine of FIG. 1.

Referring also to FIG. 2, a control system for operating the gaming machine 10 is illustrated according to one embodiment of the present invention. A coin/credit detector 26 signals a CPU 30 when a player has inserted a number of coins or has played a number of credits. The CPU 30 operates to execute a basic game program causing the video display 12 to display the basic game which includes the simulated spinning reels 16, 18, and 20 with symbols displayed thereon.

Game play is initiated by a player inserting a number of coins into the "slot," inserting one or more currency bills into a bill accepting mechanism (not shown), or playing a number of credits, causing the CPU 30 or game controller to activate one or more pay lines 22 on the display 12. The number of pay lines 22 correspond to the number of credits played according to one embodiment. The basic game commences in response to the player activating a switch 32 (e.g., by pulling a level 34 or by pressing a button). Once the player activates the switch 32, the CPU 30 sets the reels 16, 18, 20 in motion, randomly selects a game outcome, and then stops the reels to display the symbols on the reels 16, 18, 20 according to the randomly selected game outcome. A system memory 36 stores control software, operational instructions, and data associated with the gaming machine 10. A payoff mechanism 38 is operable in response to instructions from the CPU 30 to award a payoff of coins or credits to the player in response to certain winning outcomes, which may occur in the basic game or a bonus game, in accordance with a pay table stored in the system memory 36. A separate I/O controller 39 coupled to the CPU 30 operates a pendulum 40, a clock 42, an optional multiplier indicator 44, and lights 46 of the top box unit 14 according to one embodiment of the present invention. The pendulum 40, the clock 42, and the optional multiplier indicator 44 of the top box unit 14 may comprise physical, mechanical components or may be simulated on a display of the top box unit 14 in alternative embodiments of the present invention.

Figure 3:
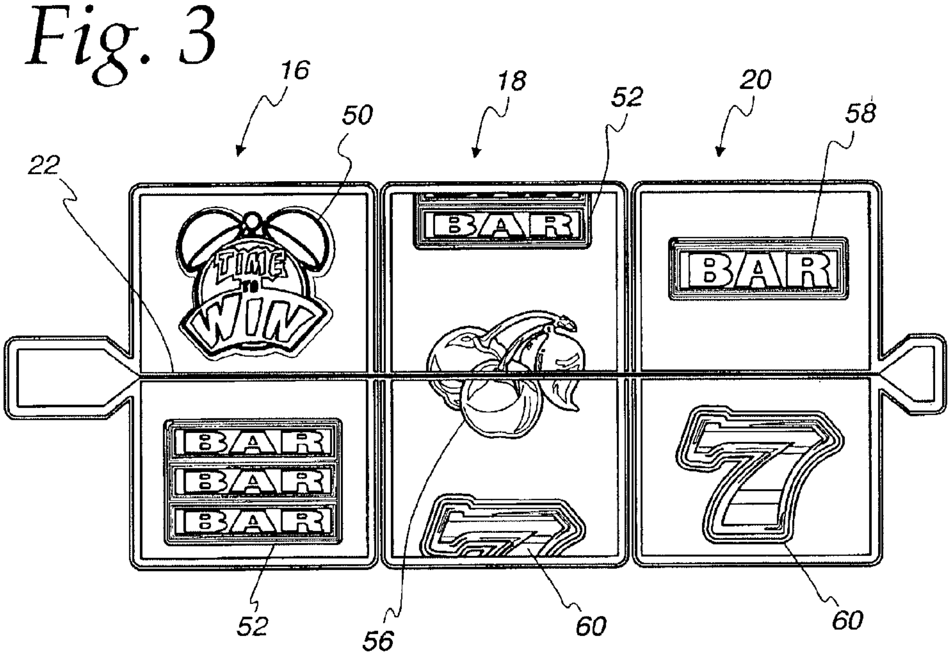
FIG. 3 is an oversized view of the reels of the gaming machine illustrated in FIG. 1.

Referring also to FIG. 3, an enlarged portion of the video display 12 is shown.

According to the depicted embodiments, the video display 12 includes three reels 16, 18, 20 having symbols displayed thereon and one pay line 22. In the depicted position, the first reel 16 (viewed from left to right) has a "TIME TO WIN" symbol 50 and a "3-BAR" symbol 52 displayed thereon. The second reel 18 has a (partial) "2-BAR" symbol 54, a "CHERRY" symbol 56, and a (partial) "SEVEN" symbol 60 displayed thereon. And the third reel 20 has a "1-BAR" symbol 58 and a "SEVEN" symbol 60 displayed thereon. The "1-BAR" symbol 58, "2-BAR" symbol 54, "3-BAR" symbol 52, "CHERRY" symbol 56, and "SEVEN" symbol 60 are "standard" symbols traditionally displayed on the reels of a slot machine. The "TIME TO WIN" symbol 50 is a "non-standard" symbol that corresponds to a theme portrayed by the gaming machine 10. For example, the gaming machine 10 has a clock-like theme associated therewith. Other gaming machines may include other non-standard symbols corresponding to particular themes portrayed by those gaming machines.

A winning combination occurs when the symbols appearing on the reels 16, 18, 20 correspond to one of the winning symbol combinations listed on a pay table. Such winning combinations are displayed relative to the pay line(s) 22. For example, one "CHERRY" symbol 56 aligned with a pay line 22, as shown in FIG. 3, may yield of payoff of two credits and three "CHERRY" symbols 56 aligned with a pay line 22 may yield a payoff of twenty credits according to the pay table. Other schemes are implemented in various embodiments such as varying the winning amount for a particular symbol combination according to which pay line 22 with which the symbol combination is aligned. For example, three "SEVEN" symbols 60 aligned with one pay line 22 may yield one hundred credits while three "SEVEN" symbols 60 aligned with a third pay line 22 may yield five hundred credits.

Figure 4:
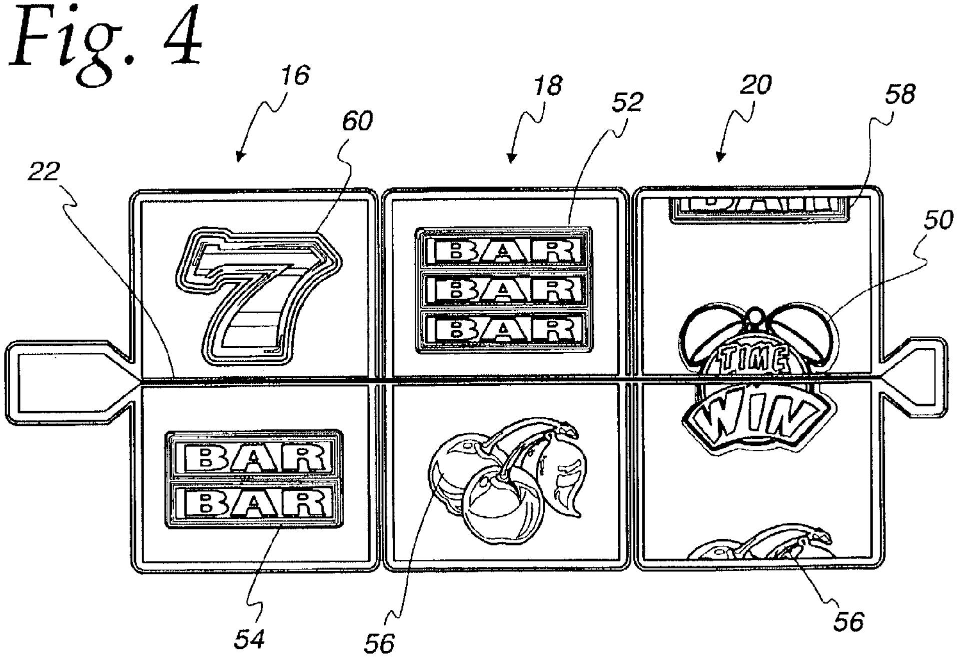
FIG. 4 is an oversized view of the reels of the gaming machine illustrated in FIG. 1 according to an alternative embodiment of the present invention.

Referring now to FIG. 4, other outcomes cause the CPU 30 to initiate a bonus game and the CPU switches from operating in a basic mode to operating in a bonus mode. For example, as illustrated in FIG. 4, the CPU 30 initiates a bonus game when a "TIME TO WIN" symbol 50 on the third reel 20 is aligned with the pay line 22. In other embodiments, a "TIME TO WIN" symbol 50 on two reels 16, 18, 20 must be aligned with the pay line 22 in order to enter the bonus game. Alternatively, the CPU 30 only initiates the bonus game when a player has wagered the maximum number of credits and one or more "TIME TO WIN" symbols 50 are aligned with the pay line 22. The latter embodiment encourages players to wager the maximum number of credits (e.g., two times or three times the credit required for play). Wagering two credits generally doubles the pay table and wagering three credits generally triples the pay table. For example, on a quarter slot machine wherein a player receives one credit for every $0.25 input to the machine, wagering three credits translates into wagering $0.75. One or more of many different combinations of symbols, reels 16, 18, and 20, pay lines 22, number credits wagered, or combinations thereof may be used to trigger the bonus round. The bonus game supplements, or replaces, the payoff in the pay table corresponding to the symbol combination on the reels.

Figure 5:
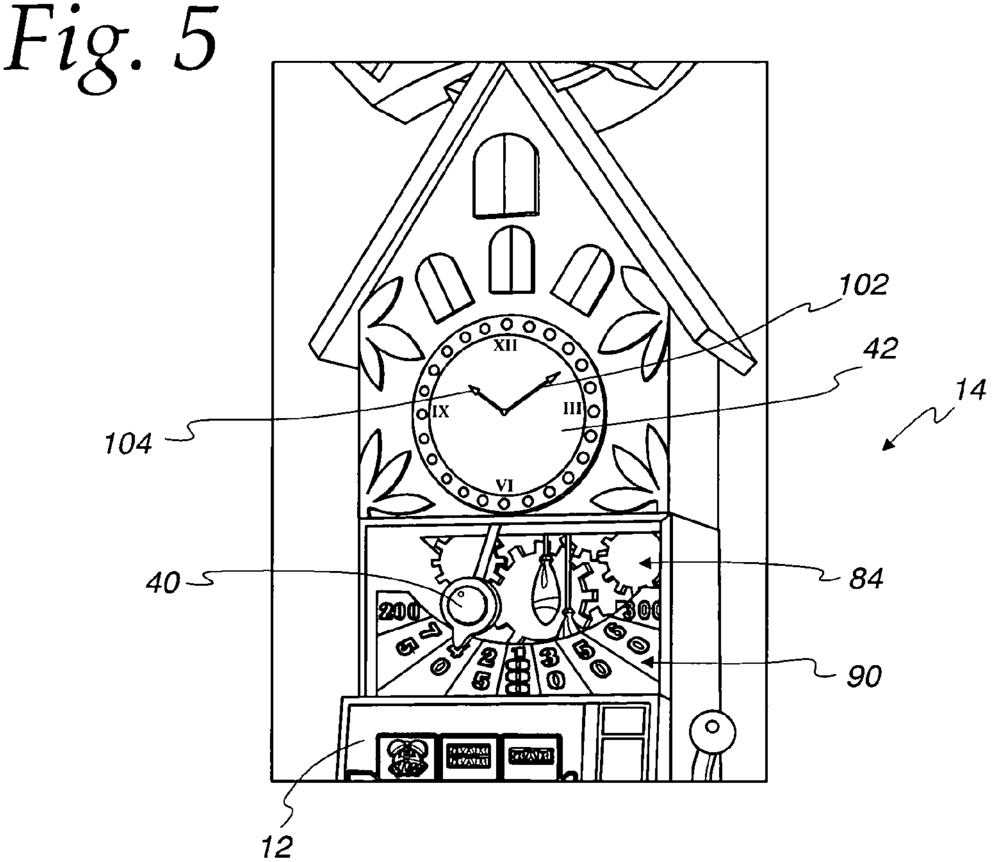
FIG. 5 is an oversized view of the top box unit of the gaming machine of FIG. 1.

Turning now to FIG. 5, the CPU 30 activates the top box unit 14 of the gaming machine 10 upon initiation of the bonus game. Generally, in the bonus round, the pendulum oscillates and randomly stops indicating the payoff of the bonus round, or the "bonus payoff." To attract the player's attention to the top box unit 14, the display 12 of the gaming machine 10 that displays the basic game may be dimmed. The top box unit 14 is clock-themed according to the depicted embodiment and includes a marquee 80 (FIG. 1). The clock-themed components of the top box unit 14 include bells 82 (FIG. 1), the clock face 42 with hour and minute hands, the pendulum 40, and clock gears 84. These clock-themed components may comprise physical, mechanical components, or may be simulated on a video display of the top box unit 14. The pendulum 40 has an oscillating end that moves or oscillates along an arcuate path 90 having a plurality of symbols, including numbers, are arrayed therealong. Symbols, including numbers, displayed on the path 90 can represent various payouts or other bonus game outcomes.

The CPU 30 directs the I/O controller 39 to operate the top box lights 46 and output audible signals consistent with the "Time To Win" theme. For example, the gaming machine 10 outputs sound simulating the ringing of alarm clock bells. Lighting for the top box unit may include lighting (e.g., back lighting) for the top box marquee 80, for the clock 42, for the gears 84, and for the path 90. When the gaming machine 10 is not in use (i.e., not being played by a player), the CPU 30 causes the gaming machine 10 to enter an attract mode. In the attract mode, the CPU 30 directs the I/O controller 39 to operate the top box unit 14 in a predetermined fashion by flashing the lights and outputting sounds designed to attract players to the gaming machine 10.

According to one embodiment of the present invention, a "TIME TO WIN" symbol 50 on the third reel 20 at the pay line 22 triggers the bonus round. Once the bonus round is triggered, the CPU 30 randomly selects a bonus game outcome (e.g., the position at which the pendulum 40 stops relative to the path 90) and then directs the I/O controller 39 to set the pendulum 40 in motion and stop the pendulum 40 at or near a number on the path 90 corresponding to the randomly selected bonus game outcome determined by the CPU 30. The CPU 30 operates the payoff mechanism 38 to award a payoff of coin or credits to the player in response to the bonus game outcome. For example, if the pendulum 40 is stopped at the "300" on the path 90, a payoff of 300 credits is awarded to the user.

The pendulum 40 is a physical pendulum that is driven by a motor (e.g., a stepper motor) according to one embodiment of the present invention. The pendulum 40 is driven back and forth by the motor to simulate the oscillating motion of a pendulum, which may occur for a predetermined amount of time before the pendulum is stopped at the predetermined position relative to the path 90. The predetermined stopping point is randomly determined by the CPU 30 upon initiation of the bonus round. The motor may slow the oscillating of the pendulum prior to stopping the pendulum to simulate the pendulum naturally coming to rest and create a sense of anticipation for the player.

According to an alternative embodiment of the present invention, the top box unit 14 includes a video display (e.g., similar to the video display 12 that displays the main game) that electronically simulates the pendulum 40. The path 90 and gears 84 may also be depicted on the electronic display of the top box unit 14. When simulated on a display, the pendulum 40 may be animated (e.g., take on the likeness of a character) in accordance with the particular theme of the gaming machine 10. The gears 84 may become animated in similar fashion. Further, if the path 90 is displayed on a video display, the various number and symbols of the path 90 may be easily changed.

Figure 6:
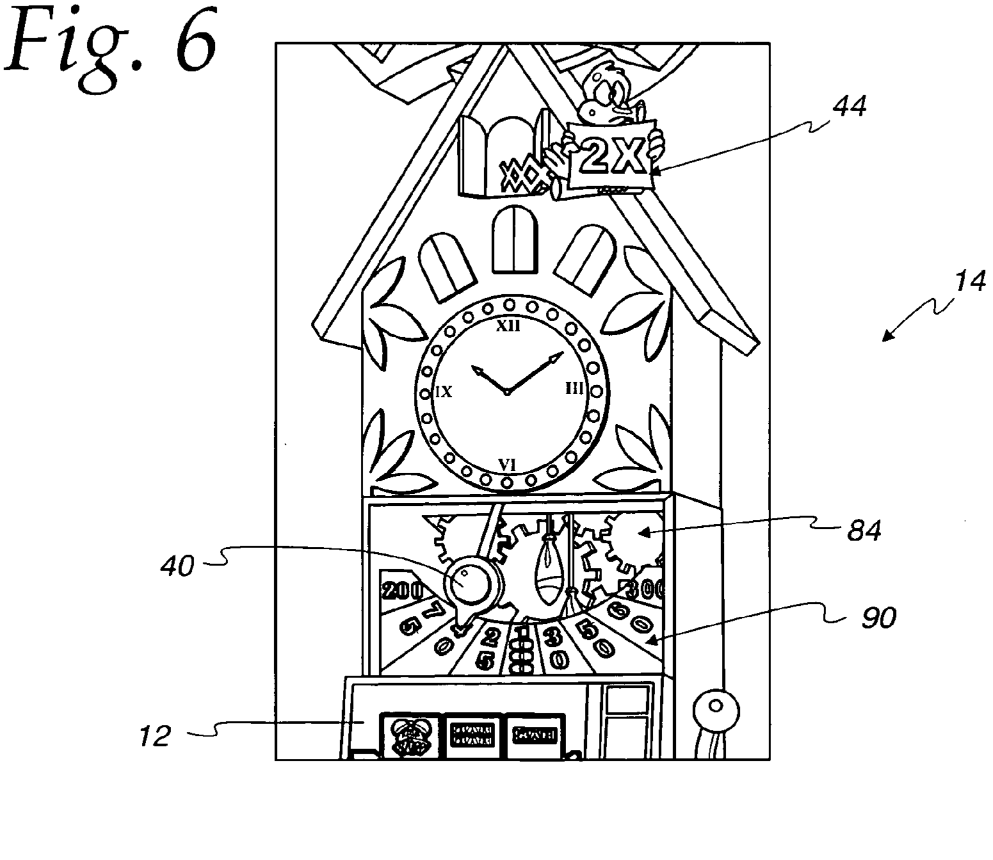
FIG. 6 is an oversized view of the top box unit of the gaming machine of FIG. 1 according to one embodiment of the present invention.
Figure 7:
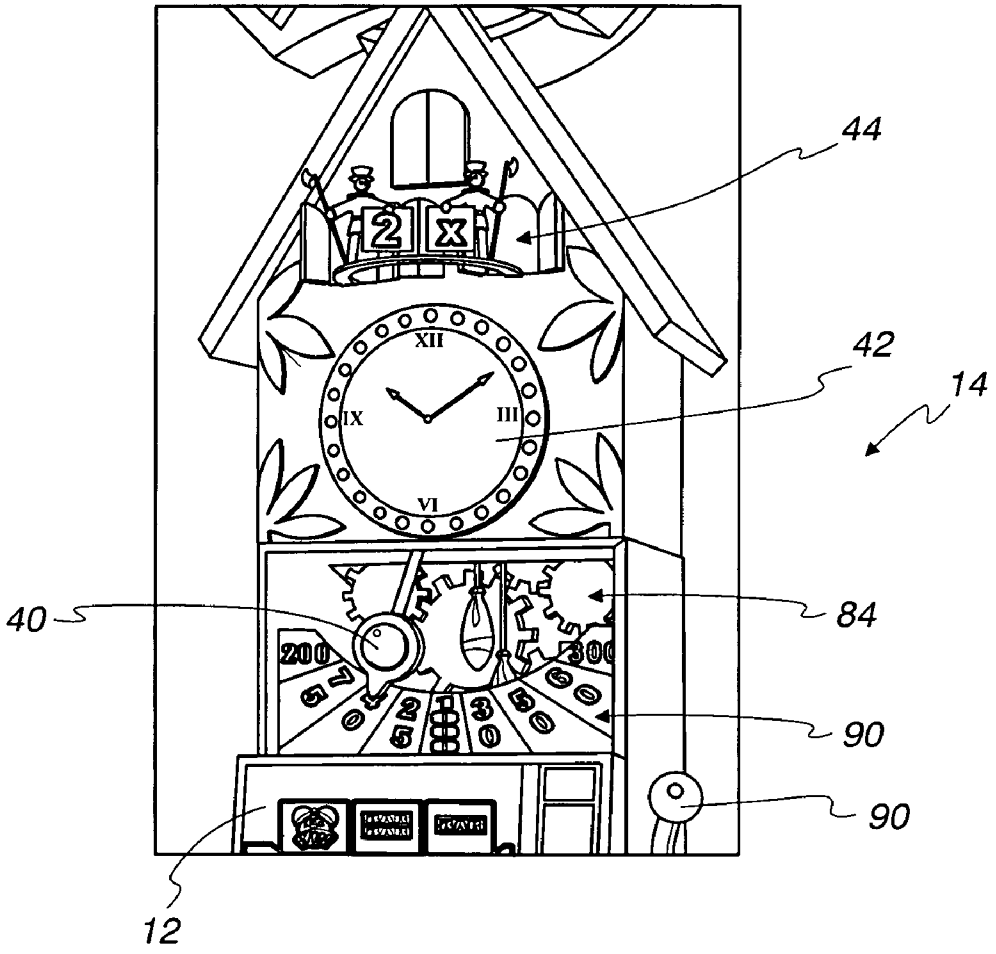
FIG. 7 is an oversized view of the top box unit of the gaming machine of FIG. 1 according to an alternative embodiment of the present invention.

Referring now to FIGS. 6 and 7, the bonus round of the gaming machine 10 may include an optional multiplier indicator 44. In the embodiment depicted in FIG. 6, the multiplier indicator 44 takes on the appearance of a cuckoo-bird of a cuckoo-clock holding the multiplier amount. In the embodiment of FIG. 7, the multiplier indicator 44 takes on the appearance of a pair of soldiers or guards holding the multiplier amount between them. In the depicted embodiments, the multiplier amount is two times ("2×"), which indicates that the bonus payout is to be doubled. The multiplier amount can vary in alternative embodiments of the present invention. Some embodiments may includes more than one multiplier indicator to indicate different multiplier amounts. For example, where the top box unit 14 comprises a display, several multiplier indicators are easily stored in memory and displayed on the top box unit display as appropriate. In another embodiment, the cuckoo-bird of FIG. 6 and the soldiers of FIG. 7 are both implemented into the same machine, wherein each displays a different multiplier.

Once the bonus round begins, the CPU 30 randomly selects whether to trigger the multiplier indicator 44, randomly selects which multiplier indicator to implement if more than one, and then triggers the multiplier indicator as shown in FIGS. 6 and 7 after the pendulum 40 has been stopped if the CPU 30 has selected to trigger the multiplier indicator 44. The CPU 30 communicates with the payoff mechanism 38 to award a payoff of coin or credits to the player in response to the bonus game outcome and the multiplier. The payoff is equal to the bonus game outcome multiplied by the multiplier.

In some of the embodiments of the present invention the bonus game is coordinated with the clock 42 of the top box unit in a variety of fashions. For example, a minute hand 102 (FIG. 5) and hour hand 104 (FIG. 5) may advance more quickly during the bonus round. Meanwhile, the pendulum is oscillating back-and-fourth. As the minute had approaches the twelve o'clock (12:00) mark, the pendulum begins to slow such that I/O controller 39 stops the pendulum 40 as the minute and hour hands 102, 104 are stopped at the twelve o'clock mark. In other alternative embodiments of the present invention, the clock 42 may be implemented into the bonus game wherein a player receives "free plays" or "free spins" on the main game. For example, an outcome of the reels 16, 18, 20 triggers this additional bonus round. The player is able to activate the switch 21 causing the CPU 30 to set the reels 16, 18, 20 in motion, randomly select a game outcome, and then stops the reels to display the symbols on the reels 16, 18, 20 according to the randomly pre-selected game outcome without playing credits during the time (e.g., one minute) of the additional bonus round. The clock 44 counts down the time of this bonus round.

In another alternative embodiment, symbols and numbers are both displayed on the path 90. The symbols can be varied to represent different amounts at different times or upon the occurrence of certain events. For example, the bonus payout array may include a "SEVEN" symbol 60, which on weekdays (when a casino often experiences less traffic) represents twenty (20) credits and on weekends represents ten credits. A bonus round pay table (e.g., a translation of the symbol selectable by the pendulum 40) may be displayed on the top box unit 14 or on the video display 12. In the embodiment wherein the path 90 is displayed on a video display, what is displayed is easily varied. For example, one or more multiplier amounts may be displayed on the path 90, which are available for selection by the pendulum. Next, if the pendulum 40 stops on a multiplier indicator, numbers are displayed along the path 90 for selection by the pendulum. The number selected by the pendulum 40 is multiplied by the prior selected multiplier amount.

While the pendulum 40 has been described thus far as a mechanism for indicating payouts associated with a bonus round of a gaming machine, the pendulum 40 is used to indicate the payouts of the main game of a gaming machine in alternatives embodiments of the present invention. For example, several pendulums 40 may oscillate along several paths 90 wherein the outcomes of the several pendulums are combined for a payout according to a payable. If the path 90 consists of numbers, the sum of the numbers may correspond to various amounts in the pay table. If the path 90 consists of symbols, the combinations may correspond to the pay table in a manner similar to the manner in which symbols on reels of a conventional slot machine corresponding to a pay table. Alternatively still, only one pendulum 40 may oscillate and stop several times—each oscillation resulting in an outcome relative to the path 90. A winning combination occurs when the combined outcomes correspond to one of the winning symbol combinations listed on the payable.

Referring back to FIG. 2, in such an embodiment, wherein the pendulum 40 selects payouts associated with a main game, the pendulum 40 may be directly linked to the CPU 30 (which would control the pendulum 40 in such an embodiment) as well as the other items associated with the pendulum (e.g., the clock 42, lights, and the multiplier indicator 44). Alternative, the pendulum(s) 40 are displayed on the video display 12.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A gaming machine, comprising:

a central processing unit for operating the gaming machine in response to a wager and for selecting a game outcome from a plurality of possible game outcomes, the game outcome being predetermined by the central processing unit; and a pendulum for indicating the game outcome selected by the central processing unit, the pendulum having an oscillating end that, in response to the selected game outcome and without player contact, undergoes controlled travel along a known path having a plurality of symbols disposed therealong and stopping substantially proximate to one of the plurality of symbols that corresponds to the selected game outcome, the controlled travel including moving the pendulum from side to side and slowing the oscillating end prior to stopping substantially proximate to one of the plurality of symbols that corresponds to the selected game outcome.

2. The gaming machine of claim 1 wherein the game outcome indicated by the pendulum is associated with a bonus game of the gaming machine.

3. The gaming machine of claim 1 wherein the game outcome indicated by the pendulum is associated with a main game of the gaming machine.

4. The gaming machine of claim 1 wherein the pendulum is a physical, mechanical pendulum.

5. The gaming machine of claim 4 comprising a motor for moving the pendulum.

6. The gaming machine of claim 1 wherein the pendulum is graphically depicted on a video display.

7. The gaming machine of claim 1 wherein the gaming machine is clock-themed.

8. The gaming machine of claim 1 wherein the plurality of symbols are depicted on a video display.

9. A gaming machine, comprising:

a pendulum having an indicator end, the indicator end being adapted to oscillate along a path having a plurality of symbols disposed therealong corresponding to a plurality of bonus game outcomes; and a central processing unit for controlling game play in a basic game mode and a bonus game mode;

the central processing unit operating in the basic game mode to select a basic game outcome from a plurality of possible basic game outcomes, the plurality of basic game outcomes including a start-bonus game outcome the selection of which causes the central processing unit to shift operation from the basic game mode to the bonus game mode, the central processing unit operating in the bonus game mode to select a bonus game outcome from a plurality of possible bonus game outcomes, the central processing unit adapted to control oscillation of the pendulum without player interaction and to suspend the oscillation of the pendulum such that the indicator end of the pendulum is stopped via instructions from the central processing unit substantially proximate one of the symbols disposed along the path corresponding to the bonus game outcome selected by the central processing unit, the controlled oscillation including moving the pendulum from side to side and slowing the oscillating end prior to stopping substantially proximate to one of the symbols.

10. The gaming machine of claim 9 wherein the pendulum is a physical, mechanical device.

11. The gaming machine of claim 9 wherein the pendulum is graphically depicted on a video display.

12. The gaming machine of claim 9 wherein one or more of the plurality of possible bonus game outcomes comprise a multiplier for increasing the amount awarded in the bonus game.

13. The gaming machine of claim 9 wherein the central processing unit is adapted to slow the oscillation of the pendulum for a predetermined amount of time prior to stopping the pendulum.

14. A method of operating a gaming machine under the control of a central processing unit in a basic game mode and a bonus game mode, the gaming machine including a pendulum having an oscillating end adapted to move along a path having a plurality of symbols displayed therealong between a first end of the path and a second end of the path opposite the first end, the plurality of symbols corresponding to a plurality of bonus game outcomes, the method comprising:

receiving a wager from a player of the gaming machine;

operating the gaming machine pursuant to the basic game mode;

selecting, under control of the central processing unit, one or more basic game outcomes from a plurality of possible basic game outcomes which include a start-bonus game outcome;

operating the gaming machine pursuant to the bonus game mode when the start-bonus game outcome is selected;

selecting, under control of the central processing unit, one or more bonus game outcomes from the plurality of bonus game outcomes when operating pursuant to the bonus game mode;

without the player contacting the pendulum, moving the oscillating end of the pendulum along the path in a side to side motion and gradually slowing the movement of the oscillating end while traveling along the path; and stopping the oscillating end of the pendulum proximate one of the plurality of symbols disposed along the path corresponding to the selected bonus game outcome.

15. The method of claim 14 wherein the symbols are depicted on a video display.

16. The method of claim 14 wherein the gradual slowing of the movement of the oscillating end of the pendulum occurs for a predetermined amount of time prior to stopping.

17. A method of operating a gaming machine under the control of a central processing unit, the gaming machine including a pendulum, the method comprising:

receiving a wager from a player of the gaming machine;

selecting, by the central processing unit, a game outcome from a plurality of possible game outcomes displayed by the gaming machine; and moving the pendulum, without player interaction, and stopping substantially proximate the game outcome selected by the central processing unit, wherein moving the pendulum includes moving the pendulum from side to side and slowing an oscillating end of the pendulum prior to stopping substantially proximate the game outcome.

18. The method of claim 17 wherein the outcome indicated by the pendulum is associated with a bonus game of the gaming machine.

19. The method of claim 17 wherein the outcome indicated by the pendulum is associated with a main game of the gaming machine.

20. The method of claim 17 wherein the pendulum is a physical, mechanical pendulum, the method comprising oscillating the pendulum.

21. The method of claim 17 wherein the pendulum is graphically depicted on a video display, the method comprising graphically depicting the pendulum as oscillating on the video display.

22. The method of claim 17 further comprising oscillating the pendulum such that the oscillating end of the pendulum moves along a path having a plurality of symbols disposed therealong.

23. The method of claim 22 wherein the plurality of symbols correspond to the plurality of game outcomes, and wherein indicating further comprises indicating one of the plurality of symbols.

* * * * *